UNITED STATES PATENT OFFICE.

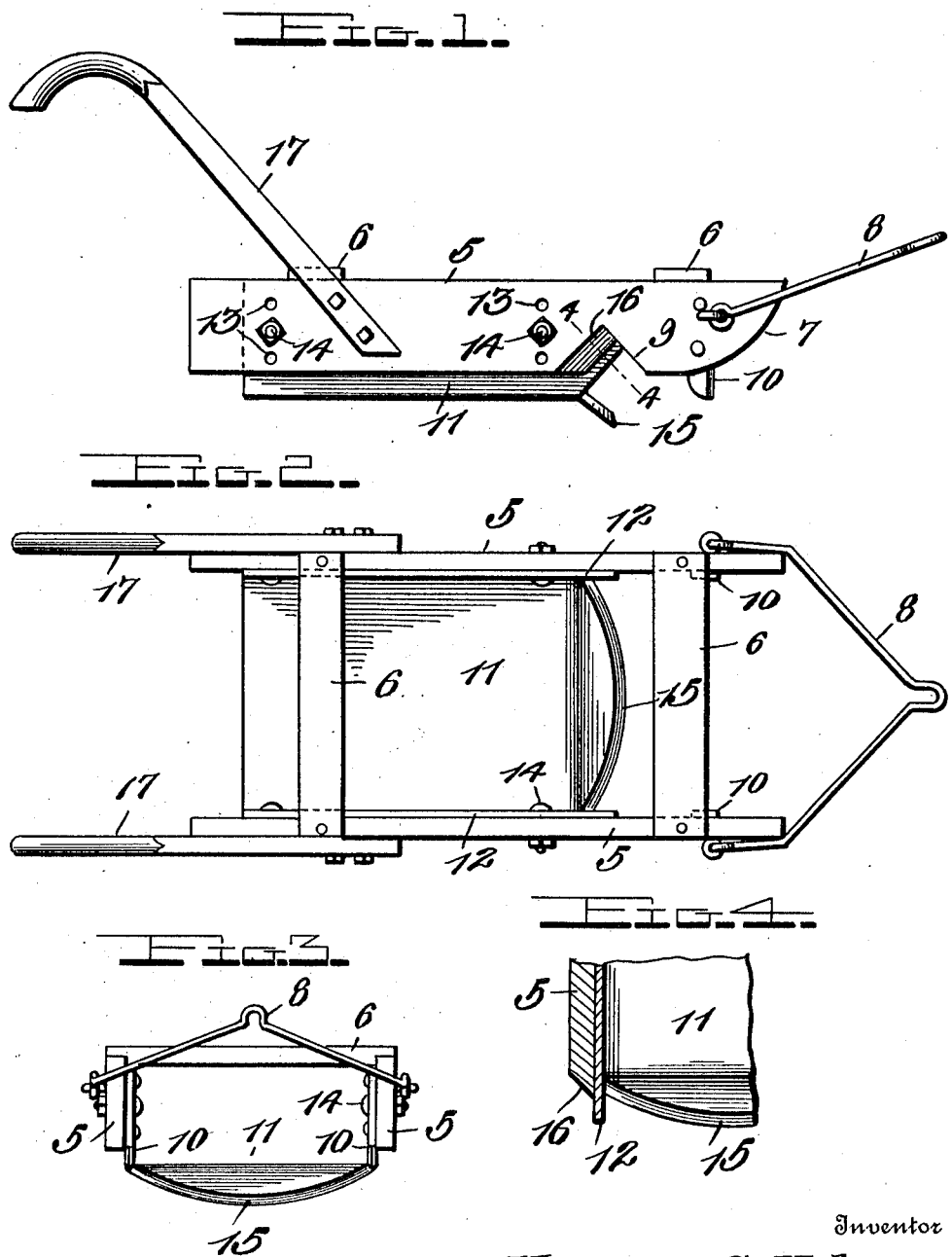

HERMAN S. URBAN, OF RICHMOND, VIRGINIA.

SOD-CUTTER.

1,020,230.

Specification of Letters Patent.   Patented Mar. 12, 1912.

Application filed July 12, 1911.   Serial No. 638,094.

*To all whom it may concern:*

Be it known that I, HERMAN S. URBAN, a citizen of the United States, residing at Richmond, in the county of Henrico and State of Virginia, have invented certain new and useful Improvements in Sod-Cutters, of which the following is a specification, reference being had to the accompanying drawings.

This invention relates to improvements in sod cutters and has for its object to provide a simple, durable and efficient device of this character whereby sod may be quickly and neatly cut.

Another object of the invention resides in the provision of means whereby the cutting plate or shoe may be readily adjusted to regulate the depth of the cut.

A still further object of the invention is to provide a pair of depending cutting knives which are adapted to cut through the sod in parallel lines, and a cutting plate arranged in the rear of said knives and having its cutting edge disposed below the points of the knives and adapted to completely detach the sod from the soil.

With the above and other objects in view, the invention consists of the novel features of construction, combination and arrangement of parts hereinafter fully described and claimed, and illustrated in the accompanying drawings, in which—

Figure 1 is a side elevation of a sod cutter embodying my improvements; Fig. 2 is a top plan view; Fig. 3 is a front end elevation; and Fig. 4 is an enlarged detail section taken on the line 4—4 of Fig. 1.

Referring in detail to the drawing 5 designates two parallel longitudinal bars which are connected adjacent their front and rear ends and at their upper edges by means of the transverse bars 6. The forward ends of the parallel bars 5 are preferably curved rearwardly and downwardly as indicated at 7 so that they will pass safely over such obstructions as may be encountered in the operation of the device. To the forward ends of the bars 5 suitable means 8 is connected to which the draft attachments may be readily connected.

At the forward ends of the bars 5, the same are provided in their lower edges with the inverted V-shaped notches 9 and to each of the bars in advance of these notches the depending cutting knives 10 are secured. The upper ends of these knife blades are secured to the inner faces of the bars 5 and depend for a suitable distance below the lower edges thereof so that they will cut into or score the sod in the movement of the machine over the same. The main sod cutting plate 11 is arranged in the rear of the cutting knives 10 and extends from the notches 9 to a point adjacent the rear ends of the bars 5. This plate is disposed between the spaced parallel bars 5 and has its longitudinal edges bent upwardly as indicated at 12 and disposed upon the inner faces of said bars. The bars 5 are provided with the spaced vertical series of openings 13 adjacent the front and rear ends of the portions 12 of the plate 11. The attaching bolts 14 are adapted to be disposed through any one of the openings in the bars and through registering openings in the vertical edge portions 12 of the sod cutting plate, said bolts being provided with suitable nuts whereby the cutting plate may be rigidly clamped in position between the bars 5. By providing the vertical series of openings 13 in the bars, it will be obvious that the sod cutting plate may be readily raised or lowered to regulate the depth to which the cutting edge thereof enters beneath the sod. The forward edge of the intermediate portion of the plate 11 is sharpened to a knife edge and is slightly curved as indicated at 15, said cutting edge being also bent downwardly or disposed below the plane of the body portion of the plate 11.

It will be observed from reference to Fig. 4 that the rear inclined edges of the notches 9 in the bars 5 are beveled outwardly from the outer faces of the portions 12 of the sod cutting plate 11 as shown at 16. Thus earth, stones or other material which is thrown up by the cutting knives 10 will not wedge between the rear edges of said knives and the forward edge of the vertical walls of the plate 11 but will be deflected outwardly by said beveled edges of the notches 9.

The bars 5 are provided at their rear ends with the upwardly and rearwardly extending handle bars 17 by means of which the machine may be guided in its movement over the ground.

From the foregoing description it is thought that the construction and operation of the device will be readily understood.

As the machine is drawn over the sod, the forward cutting knives 10 engage in the same and score, or cut the sod in parallel lines. The operator, grasping the handles 17 exerts sufficient pressure on the bars 5 to cause the forward cutting edge of the plate 11 to cut through the sod to a greater depth than the cutting knives 10 and to detach the sod from the soil. As the machine moves forwardly, the sod moves over the surface of the body portion of the plate 11 which is disposed between the bars 5. In this manner the sod is cut in long strips and of equal depth throughout their length. By simply adjusting the main sod cutting plate 11 as previously described, the depth of the sod may be varied as desired. The device is extremely simple in construction and may be manufactured at a low cost. It is also very durable and efficient in practical use and provides means whereby sod may be quickly cut in large quantities.

While I have shown and described the preferred construction and arrangement of the various parts, it will be understood that the machine is susceptible of considerable modification in the form, proportion and arrangement of parts without departing from the essential feature or sacrificing any of the advantages of the invention.

Having thus described the invention what is claimed is:—

A sod cutter comprising spaced parallel longitudinal bars and transverse bars connecting the same, depending sod cutting knives secured to the forward ends of said longitudinal bars, the forward ends of said bars having inverted V-shaped notches in their lower edges, the rear edges of said notches being outwardly beveled, a sod cutting plate arranged between said parallel bars and having its cutting edge disposed below the lower ends of said cutting knives, and means for vertically adjusting said plate to regulate the depth to which the sod is cut.

In testimony whereof I hereunto affix my signature in the presence of two witnesses.

HERMAN S. URBAN.

Witnesses:
M. C. LYDDANE,
E. H. L. WHITE.

---

Copies of this patent may be obtained for five cents each, by addressing the "Commissioner of Patents, Washington, D. C."